2,865,770
WHISKEY AGING

Gordon B. Nickol, Cincinnati, Ohio, assignor to National Distillers and Chemical Corporation, New York, N. Y., a corporation of Virginia No Drawing. Application July 6, 1955
Serial No. 520,362

11 Claims. (Cl. 99—181)

This invention broadly concerns improvements in the art of whiskey production, and more particularly, is concerned with treatment of the wooden whiskey barrels used in the aging of spirits.

During the production of spirit liquors such as whiskey, the liquids are stored for considerable periods of time in charred white oak barrels. During this period, which is usually from 4 to 8 years, the whiskey matures. Such a maturation process is highly dependent on the slight porosity of the barrel which permits the passage of air into the interior of the package and a slow oxidation apparently results on the surface of the liquid. A slight amount of liquid passes into the pores of the barrel and this liquid evaporates from the exterior surface of the barrel. A portion of the liquid that passes into the pores of the staves returns and certain constituents of the wood are transferred into the liquid in the barrel. Thus the liquid is slowly colored and flavored by dissolving more and more of the solubles in the oak. These solubles are known as extractives and amount to about 200 grams per 100 liters of whiskey in 4 years.

It also appears that the vapors which permeate the wood release volatile constituents, such as acetic acid, which return to the whiskey. These volatile materials add to the flavor of the whiskey either in their uncombined state or by reaction with the alcohol.

The time element is highly important in the complex process of extraction and chemical reaction which eventually changes an unpalatable high wine to mature whiskey. As a result of the time required for this maturation, a considerable amount of alcohol is lost by evaporation.

The losses which occur during aging of whiskey are very large, amounting to approximately 20% of the starting contents of the barrel, during a typical 4 year aging period. A great deal of this loss is caused by seepage, diffusion, evaporation, and leakage of whiskey vapors, including substantial quantities of alcohol vapors, through the pores and along the grain of the wooden barrels.

While some attempts have been made to reduce these losses, these attempts invariably meet with the objection that the flavor is adversely affected. For example, barrels have been completely enclosed in metal boxes or drums so that there was little if any evaporation of alcohol, but the whiskey produced after four years' aging was of very poor quality and compared to whiskey which had been aged six months to a year under normal aging procedure. Actually there was relatively little known with regard to aging losses and means of reducing and controlling them.

A method has now been discovered by which these tremendous and unnecessary losses can be controlled and substantially prevented and, at the same time, the good effects of aging allowed to proceed and remain undisturbed.

In accordance with the invention, barrels are coated with a material such as will substantially restrict and reduce alcohol evaporation from the barrel, will have substantially no adverse effects on the maturation of whiskey during aging and will contribute substantially no off odors or taste to the whiskey. The improved results embodied herein are obtained by application to the exterior or some portion of the aging barrel, prior to or during storage thereof, a material adapted to forming a vapor-proof, semi-permeable film which will not communicate any undesirable taste or smell to the contents of the barrel.

In order to achieve these objectives, the material must be applied in an aqueous vehicle since any other kind of solvent would produce a deleterious effect upon the flavor. The barrels are at least partially coated with a semi-permeable film which restricts alcohol losses without interfering with aging. At least 25% of the barrel surface should be coated for satisfactory results. It is also possible to obtain fairly good results by coating both heads and stave ends in lieu of the complete coating. Excellent results can also be obtained by coating between the staves, around the bead of the head and in the croze.

Preliminary tests were carried out to establish possible types of materials which would satisfy these requirements. The materials which have been found to best meet these specifications are water emulsions of polyvinyl polymers, particularly the aqueous colloidal dispersions of polyvinyl chloride. The dispersions may contain additives, depending upon the particular requirement for attainment of improved results, such additive materials being substances that function as wetting agents, dispersing agents, stabilizers, fillers, and the like, with certain specific additives.

The water emulsion of the polyvinyl polymers, such as polyvinyl chloride has been applied by brush, spray and by dipping, and any of the three methods appears satisfactory. The outside surface of the barrels or a portion thereof is preferably given two coats of the material a few days or more prior to the filling of the barrels in order to assure that the coating is thoroughly dried. Once the emulsion has dried, it has been found not to contribute flavor to alcohol solutions, even when submerged directly in the alcohol.

EXAMPLE 1

Numerous materials were given a preliminary screening to find those which would contribute little or no odor and/or flavor to alcohol. Alcohol of 105 proof was used for testing, since this is the approximate proof at which the high wines are used in practice for aging in barrels. Those materials which contained organic solvents were avoided, since with barrels coated with such materials, a considerable portion of the solvent would remain in the wood and would eventually get into the whiskey. The compounds found to be most acceptable in odor were tested by coating small hollow oak-wood cylinders. These cylinders were filled with 105 proof alcohol and sealed with an oak wood, paraffin-soaked plug. Weight lost by the cylinders in seven days was used as a means of determining the best vapor proof coating. Results of these tests are given below in Table I.

Table I
EFFECT OF VAPOR BARRIER COATING ON EVAPORATION LOSSES

| Coating Material | Percent Loss in Weight in 7 days, based on loss from Uncoated Barrel |
|---|---|
| Pliolite Latex [1] (2 coats) | 96.5 |
| Pliolite Latex [1] (2 coats, baked) | 53.0 |
| Paraffin (hot dipped) | 37.0 |
| Spred Vapor Barrier [2] (2 coats) | 21.0 |
| Geon Latex Compound 360-35632 [3] (2 coats) | 17.5 |

[1] Pliolite latex is a colloidal dispersion of unplasticized cyclo rubber in water emulsion.
[2] Spred Vapor Barrier is an oil base paint thinned with water.
[3] Geon Latex Compound 360-35632 is a colloidal dispersion in water of preplasticized polyvinyl chloride with wetting agent, dispersing agent, stabilizer and fillers such as alginates, casein, cellulose derivatives and/or polyacrylates.

From the data in Table I above, it can be seen that a number of the materials were effective in reducing evaporation losses. However, the colloidal dispersion in water of polyvinyl chloride was the best. Though the oil base material was satisfactory from the standpoint of reducing losses, it was found that this material had a slightly objectionable solvent odor which might be undesirable in whiskey.

The Pliolite latex (water emulsion of cyclo rubber) was not satisfactory as it was not nearly as effective as the polyvinyl chloride dispersion.

Though paraffin was somewhat effective, it was found that when the wood expanded as it became saturated with water and alcohol, the paraffin coating had a tendency to crack and, as a result, lost its effectiveness as a vapor barrier.

EXAMPLE 2

A relatively small scale experiment was carried out using twenty-five barrels which were given two complete coats of the aforedescribed polyvinyl chloride dispersion. These barrels were then filled with approximately fifty gallons of whiskey. At the end of 1½ years aging these coated barrels lost 17.65% less of their contents than uncoated control barrels. Another 25 barrels were similarly coated between the staves, and around the croze and beads of the heads with this material. These barrels lost 16.1% less than control barrels in 1½ years. No difference in flavor could be detected in samples of whiskey taken at the end of one year from the coated barrels and uncoated barrels used as controls.

EXAMPLE 3

The aforedescribed polyvinyl chloride dispersion has reduced alcohol losses from barrels to 77% of that of uncoated barrels. Results of two experiments are given in Table II to show the reduction in losses effected by coating barrels with this material.

Table II
EFFECT OF POLYVINYL CHLORIDE DISPERSION ON WHISKEY LOSSES FROM BARRELS

| | Age of Whiskey, years | Average Wt. Loss Uncoated Barrels, lbs./barrel | Average Wt. Loss Coated Barrels, lbs./barrel |
|---|---|---|---|
| Experiment #1—25 barrels each | 3 | 52.3 | 44.6 |
| Experiment #2—40 barrels each | 2 | 22.8 | 17.5 |

Taste tests demonstrated that this coating on the barrel does not affect the flavor in any way, either by contributing flavors or by interfering with the aging process. Samples of three-year-old whiskey from latex coated and control barrels were submitted to 79 testers in the form of triangular tests. Only 26 of the 79 testers correctly identified the odd sample, and of these, 15 preferred the whiskey from the latex coated barrels. Thus, there was no significant difference between the whiskeys from coated and uncoated barrels.

EXAMPLE 4

Results of a rank order test sent to taste testing panels for evaluation of the whiskey from barrels completely coated with polyvinyl latex, barrels coated between the staves and around the croze, and control barrels indicate that all of these whiskeys are preferred equally.

A summary of the regauge data obtained after 4½ years aging is shown below in Table III. The barrels completely coated with the latex lost 9.3% less alcohol than the control barrels and the barrels coated between the staves lost 19.3% less than the control barrels.

Table III
REGAUGE DATA FROM EXPERIMENTAL AND CONTROL BARRELS—AVERAGE BARRELS

| Barrels | Gross Wt., lbs. | Tare Wt., lbs. | Net Wt., lbs. | Evap. Loss, lbs. | Soakage Loss, lbs. | Total Loss, lbs. | Final Proof | Loss in P. G. |
|---|---|---|---|---|---|---|---|---|
| Control | 453.52 | 82.46 | 371.06 | 85.86 | 16.30 | 102.16 | 112.36 | 11.00 |
| Completely coated | 457.12 | 83.96 | 373.16 | 74.48 | 17.42 | 91.90 | 111.00 | 9.98 |
| Coated between staves | 459.96 | 84.26 | 375.66 | 73.50 | 15.40 | 88.90 | 112.48 | 8.88 |

EXAMPLE 5

The data in Table IV is the chemical analysis of representative samples removed from the coated barrels after aging for 4 years, and these data illustrate that chemical constituents were not altered by barrel coating.

Table IV
CHEMICAL ANALYSES OF WHISKEY FROM BARRELS COATED WITH GEON LATEX COMPOUND

| | Control | Completely Coated | Coated between Staves |
|---|---|---|---|
| Proof | 111.3 | 110.5 | 111.3 |
| Total Acids, g./100 l. | 69.6 | 69.6 | 68.4 |
| Volatile Acids, g./100 l. | 60.0 | 60.0 | 58.2 |
| Esters, g./100 l. | 44.0 | 44.0 | 46.7 |
| Solids, g./100 l. | 169 | 182 | 178 |
| Aldehydes, g./100 l. | 5.17 | 5.39 | 6.49 |
| Color Percent L. T. | 50.9 | 49.2 | 48.0 |
| pH | 4.41 | 4.41 | 4.44 |

While there are above disclosed but a limited number of embodiments of the invention herein presented, it is possible to produce still other embodiments without departing from the inventive concept herein disclosed, and it is desired therefore that only such limitations be imposed on the appended claims as are stated therein.

What is claimed is:

1. An improvement in the aging of spirit liquors which comprises applying to an aging barrel a coating of a polyvinyl polymer in an aqueous vehicle whereby loss of volatile materials during aging of said spirit liquors is substantially reduced.

2. An improvement in the aging of spirit liquors which comprises coating at least 25% of the outside surfaces of an aging barrel with a polyvinyl chloride polymer in an aqueous vehicle thereby substantially reducing the loss of volatile materials, including ethyl alcohol, during the aging period.

3. An improvement in the aging of whiskey which comprises applying to an aging barrel for said whiskey at least one coating of polyvinyl chloride in an aqueous vehicle, thereby substantially reducing the loss of volatile materials, including ethyl alcohol, from said coated barrel during the aging period.

4. An improvement in the aging of whiskey which comprises applying, to an aging barrel for said whiskey, a polyvinyl polymer in an aqueous vehicle between the staves, around the croze, and on the bead of the head thereby substantially reducing the loss of ethyl alcohol during the aging period.

5. An improvement in the aging of whiskey which comprises the steps of applying at least one coating of an aqueous emulsion of a polyvinyl polymer to a substantial portion of the outside surfaces of an aging barrel for said whiskey prior to filling said barrel, filling said barrel with whiskey, thereafter aging said whiskey in said barrel, whereby loss of volatile material, including ethyl alcohol from said barrel, during aging, is substantially reduced.

6. An improved process for storage and aging spirit liquors which comprises storing said spirit liquors for a substantial period of time in an aging barrel a substantial portion of the outside surfaces of which have been coated with a film of a polyvinyl chloride polymer, whereby losses of volatiles from the spirit liquors during the storage period are substantially reduced.

7. An improved process for storage and aging of whiskey which comprises storing said whiskey for a substantial period of time in an aging barrel having a coating of a polyvinyl chloride polymer, thereby substantially decreasing loss of volatile material, including ethyl alcohol, from the barrel, during the storage period.

8. An improved process for storage and aging of whiskey which comprises storing and aging said whiskey for a substantial period of time in a wooden aging barrel coated with a film of polyvinyl chloride, whereby losses of volatiles including ethyl alcohol, from the aging barrel during the aging period are substantially reduced.

9. A wooden aging barrel for storing and aging spirit liquors having a substantial portion of its outside surface coated with a film of a polyvinyl polymer.

10. A wooden spirit liquors aging barrel having a substantial portion of its outside surface coated with a film of a polyvinyl chloride polymer.

11. A wooden whiskey aging barrel having its outside surface coated with a polyvinyl chloride polymer.

References Cited in the file of this patent

UNITED STATES PATENTS

| | | |
|---|---|---|
| 2,427,513 | Spessard | Sept. 16, 1947 |
| 2,681,322 | Auer | June 15, 1954 |